United States Patent
Lee et al.

(10) Patent No.: US 8,493,020 B2
(45) Date of Patent: Jul. 23, 2013

(54) APPARATUS AND METHOD FOR CHARGING AND DISCHARGING PHOTOVOLTAIC PCS INTEGRATED BATTERY

(75) Inventors: Tae Won Lee, Gyunggi-do (KR); Dong Seong Oh, Incheon (KR); Jin Wook Kim, Seoul (KR); Hee Sung Moon, Gwangju (KR); Jeong Min Ko, Jeju-do (KR); Jong Soo Kim, Gyunggi-do (KR); Chung Yuen Won, Gyunggi-do (KR); Byoung Kuk Lee, Gyunggi-do (KR); Gyu Yeong Choe, Gyunggi-do (KR)

(73) Assignees: Samsung Electro-Mechanics Co., Ltd., Gyunggi-Do (KR); Sungkyunkwan University Foundation for Corporate Collaboration, Gyunggi-Do (KR)

( * ) Notice: Subject to any disclaimer, the term of this patent is extended or adjusted under 35 U.S.C. 154(b) by 385 days.

(21) Appl. No.: 12/899,938

(22) Filed: Oct. 7, 2010

(65) Prior Publication Data

US 2011/0273130 A1 Nov. 10, 2011

(30) Foreign Application Priority Data

May 6, 2010 (KR) .......................... 10-2010-0042603

(51) Int. Cl.
*H02J 7/00* (2006.01)
*H01M 10/44* (2006.01)
*H01M 10/46* (2006.01)

(52) U.S. Cl.
USPC ............................................ 320/101; 307/66

(58) Field of Classification Search
USPC ......................................................... 320/101
See application file for complete search history.

(56) References Cited

U.S. PATENT DOCUMENTS

| 6,487,096 B1 * | 11/2002 | Gilbreth et al. ................. 363/35 |
| 7,193,872 B2 | 3/2007 | Siri |
| 7,906,934 B2 * | 3/2011 | Inoue et al. ................... 320/101 |
| 2006/0017328 A1 * | 1/2006 | Bryde ............................. 307/64 |

FOREIGN PATENT DOCUMENTS

KR 1020090085973 A 8/2009

OTHER PUBLICATIONS

Office Action for KR 10-2010-0042603 dated Oct. 15, 2011.

* cited by examiner

*Primary Examiner* — Samuel Berhanu
(74) *Attorney, Agent, or Firm* — Lowe Hauptman Ham & Berner, LLP

(57) ABSTRACT

There are provided an apparatus and method for charging and discharging a photovoltaic PCS integrated battery applied to a system that includes a first DC/DC converter 110 connected to a solar cell 10, a DC/AC inverter 120, a DC link unit 130 connected in common to output terminals of the first DC/DC converter 110 and the DC/AC inverter 120, and a second DC/DC converter 140 having a bidirectional DC/DC conversion function connected between the DC rink unit 130 and the battery 30. The present invention calculates the amount of photovoltaic power produced by the solar cell 10 based on voltage and current detected in the voltage/current detector 200, determines one of predetermined control modes according to the amount of photovoltaic power and the connection or not of the battery, and controls the first DC/DC converter 110, the second DC/DC converter, and the DC/AC inverter according to the determined control mode.

20 Claims, 16 Drawing Sheets

FIRST OPERATING MODE

APPARATUS AND METHOD FOR CHARGING AND DISCHARGING PHOTOVOLTAIC PCS INTEGRATED BATTERY

CROSS-REFERENCE TO RELATED APPLICATIONS

This application claims the priority of Korean Patent Application No. 10-2010-0042603 filed on May 6, 2010, in the Korean Intellectual Property Office, the disclosure of which is incorporated herein by reference.

BACKGROUND OF THE INVENTION

1. Field of the Invention

The present invention relates to an apparatus and method for charging and discharging a photovoltaic power conditioning system (PCS) integrated battery usable for a vehicle, and more particularly, to an apparatus and method for charging and discharging a photovoltaic power conditioning system (PCS) integrated battery capable of charging a battery using photovoltaic energy and/or system voltage and supplying photovoltaic energy or battery voltage to a system, by combining the photovoltaic PCS with a battery charger.

2. Description of the Related Art

Recently, with increased interest of a photovoltaic technology, an environmentally-friendly technology, research and development into component technology such as a PV module, a power converter (PCS), or the like, and a system technology thereof has been conducted. In particular, demand for research into and development of a PCS that can transfer power from the photovoltaic module to the system at maximum efficiency is ever increasing in the PV PCS field.

Further, an electric automobile using electricity as a power source and a hybrid automobile using two or more power sources have been developed. In particular, the electric automobile uses stored electric energy as a power source, such that it is advantageous in implementing a pollution-free vehicle having low-cost driving.

Despite the advantage thereof, the electric automobile has not yet been widely propagated due to technical limitations. Representative technical limitations are related to a battery storing electric energy and a battery charger capable of recharging battery voltage.

First, the problem with the battery is that the time required to recharge the energy to be stored therein is approximately 8 hours, the distance an automobile is able to travel on a single charge is relatively short when the necessity of performing frequent charging is considered, and the lifespan of the battery is remarkably small as compared to the expected period of automobile use.

Further, since the existing battery charger depends on only the system voltage rather than environmentally-friendly energy, there is no battery charger that can stably charge the battery voltage using sunlight that is an environmentally-friendly energy source.

SUMMARY OF THE INVENTION

An aspect of the present invention provides an apparatus and method for charging and discharging a photovoltaic PCS integrated battery capable of combining a photovoltaic PCS with a battery charger to charge a battery using photovoltaic energy and/or system voltage and supplying photovoltaic energy or battery voltage to a system.

According to an aspect of the present invention, there is provided an apparatus for charging and discharging a photovoltaic PCS integrated battery, including: a first DC/DC converter that converts PV voltage from a solar cell into a predetermined DC voltage according to a first DC/DC control; a DC/AC inverter that is connected to a system and performs system voltage/DC voltage conversion or DC voltage/system voltage conversion according to a second DC/DC control; a DC link unit that is connected in common to an output terminal of the first DC/DC converter and an output terminal of the DC/AC inverter to stabilize DC voltage from the first DC/DC converter and DC voltage from the DC/AC inverter; a second DC/DC converter that is connected between the DC link unit and a battery to convert voltage bidirectionally according to a second DC/DC control, a voltage/current detector that detects PV voltage/current from the solar cell, battery voltage/current from the battery, system voltage/current from the system, and DC link voltage/current from the DC link unit; and a charging control unit that determines one of a plurality of predetermined control modes based on the voltage and current detected in the voltage/current detector and controls the first DC/DC converter, the second DC/DC converter, and the DC/AC inverter according to the determined control mode.

The charging control unit calculates the amount of photovoltaic power produced by the solar cell based on the voltage and current detected in the voltage/current detector and determines one of first to fourth control modes according to the amount of photovoltaic power and the connection or not of the battery.

The charging control unit includes: a state determining unit that determines any of the predetermined first to fourth operating modes based on the amount of photovoltaic power and the connection or not of the battery by using the PV voltage/current and the battery voltage/current detected in the voltage/current detector, a first converter controller that controls the first DC/DC converter according to the operating mode determined in the state determining unit; an inverter controller that controls the DC/AC inverter according to the operating mode determined in the state determining unit; and a second converter controller that controls the second DC/DC converter according to the operating mode determined in the state determining unit.

The charging control unit controls the first DC/DC converter, the DC/AC inverter, and the second DC/DC converter to charge the battery by using the photovoltaic energy from the solar cell in the first operating mode.

The charging control unit controls the first DC/DC converter, the DC/AC inverter, and the second DC/DC converter to charge the battery by using the photovoltaic energy from the solar cell and the system voltage in the second operating mode.

The charging control unit controls the first DC/DC converter, the DC/AC inverter, and the second DC/DC converter to charge the battery by using the system voltage in the third operating mode.

The charging control unit controls the first DC/DC converter, the DC/AC inverter, and the second DC/DC converter to transfer the photovoltaic energy from the solar cell to the system in the fourth operating mode.

According to another aspect of the present invention, there is provided a method for charging and discharging a photovoltaic PCS integrated battery applied to a system that includes a first DC/DC converter connected to a solar cell, a DC/AC inverter connected to a system, a DC link unit connected in common to an output terminal of the first DC/DC converter and an output terminal of the DC/AC inverter, and a second DC/DC converter having a bidirectional DC/DC conversion function connected between the DC rink unit and the battery, the method comprising: detecting step that detects PV voltage/current detected in a predetermined node, battery voltage/current, system voltage/current, and DC link voltage; a state determining step that determines any of predetermined first to fourth operating modes based on the amount of photovoltaic power and the connection or not of the battery by using the PV voltage/current and the battery voltage/current; a first control step that controls the charging of the battery by using the photovaltaic energy of the solar cell in the first operating mode; a second control step that controls the first DC/DC converter, the DC/AC inverter, and the second DC/DC converter to charge the battery by using the photovoltaic energy of the solar cell and the voltage of the system in the second operating mode; and a third control step that controls the first DC/DC converter, the DC/AC inverter, and the second DC/DC converter to charge the battery by using the voltage of the system in a third operating mode.

The method for charging and discharging the photovoltaic PCS integrated battery further includes a fourth control step that controls the first DC/DC converter, the DC/AC inverter, and the second DC/DC converter in order to transfer the photovoltaic energy of the solar cell to the system in the fourth operating mode The state determining step determines a first control mode when the power from the solar cell is higher than the charge amount needed in the battery in a state in which the battery is connected, based on the amount of photovoltaic power and the connection or not of the battery by using the PV voltage/current and the battery voltage/current, determines a second control mode when the power from the solar cell is not higher than the charge amount needed in the battery in the state in which the battery is connected, determines a third control mode when there is no power from the solar cell in the state in which the battery is connected, and determines a fourth operating mode in the state in which the battery is not connected The first control step uses the DC/DC converter and the DC/AC inverter to control maximum power point tracking, DC link voltage and system link and control the current charging through the second DC/DC converter.

The second control step uses the DC/DC converter and the DC/AC inverter to control the maximum power point tracking, the DC link voltage, and the PWM converter and control the current charging through the second DC/DC converter.

The third control step stops the operation of the DC/DC converter and controls the current charging and the current discharging by using the DC/AC inverter and the second DC/DC converter.

The fourth control step uses the DC/DC converter and the DC/AC inverter to control the maximum power point tracking, the DC link voltage and the system link and control the operation stop of the second DC/DC converter.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
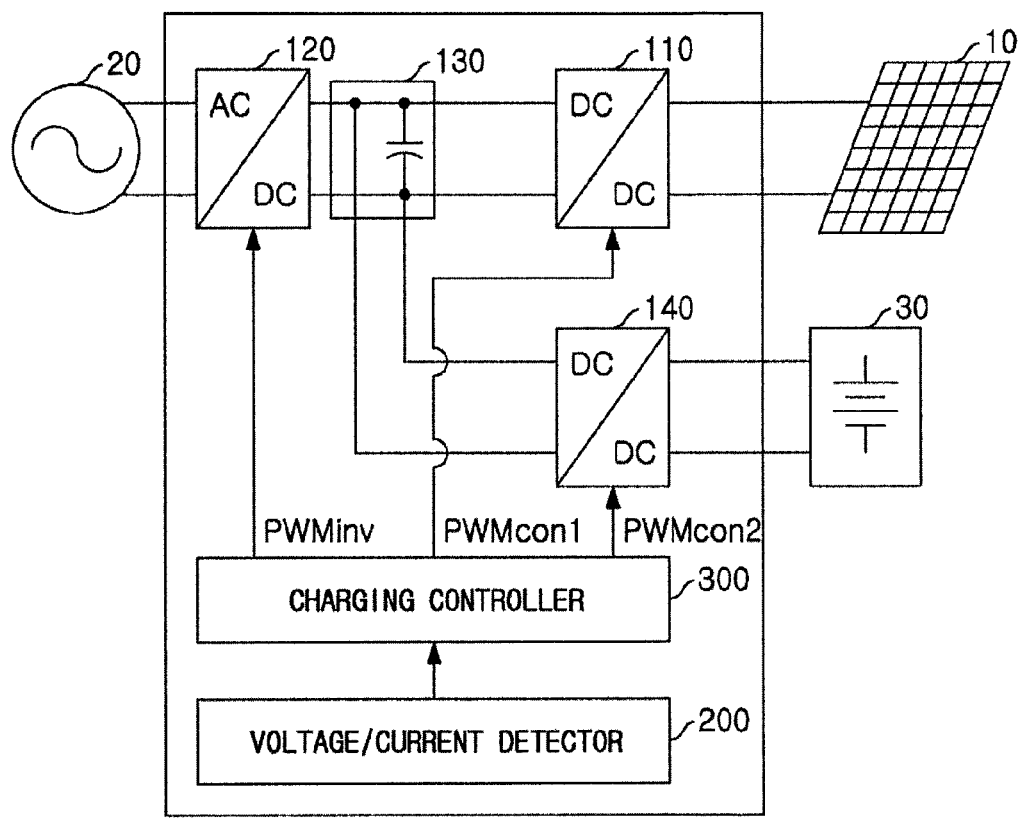
FIG. 1 is a block diagram of an apparatus for charging and discharging a photovoltaic PCS integrated battery according to the present invention.

Exemplary embodiments of the present invention will now be described in detail with reference to the accompanying drawings.

The present invention should not be limited to the embodiments set forth herein and the embodiments may be used to assist in understanding the technical idea of the present invention. Like reference numerals designate like components having substantially the same constitution and function in the drawings of the present invention.

FIG. 1 is a block diagram of an apparatus for charging and discharging a photovoltaic PCS integrated battery according to the present invention.

Referring to FIG. 1, an apparatus for charging and discharging a photovoltaic PCS integrated battery according to the present invention may include a first DC/DC converter 110 that converts PV voltage from a solar cell 10 into predetermined DC according to a first DC/DC control, a DC/AC inverter 120 that is connected a system, performs system voltage/DC voltage (DC/AC) conversion or DC voltage/system voltage (DC/AC) conversion according to a second DC/DC control, a DC link unit 130 that is connected in common to an output terminal of the first DC/DC converter 110 and an output terminal of the DC/AC inverter 120 to stabilize DC voltage from the first DC/DC converter 110 and DC voltage from the DC/AC inverter 120, a second DC/DC converter 140 that is connected between the DC link unit 130 and a battery to convert voltage bidirectionally according to a second DC/DC control, a voltage/current detector 200 that detects PV voltage/current Vpv/Ipv from the solar cell 10, battery voltage/current Vbatt/ibatt from the battery 30, system voltage/current Vg/Igc from the system 20, and DC link voltage Vdc from the DC link unit 130, and a charging control unit 300 that determines one of a plurality of predetermined control modes based on the voltage and current detected in the detector 200 and controls the first DC/DC converter 110, the second DC/DC converter, and the DC/AC inverter according to the determined control mode.

For example, the charging control unit 300 may be configured to calculate the amount of photovoltaic power produced by the solar cell 10 based on the voltage and current detected in the voltage/current detector 200 and to determine one of the predetermined first to fourth control modes according to the amount of photovoltaic power produced by the solar cell and the connection or not of the battery.

Figure 2:
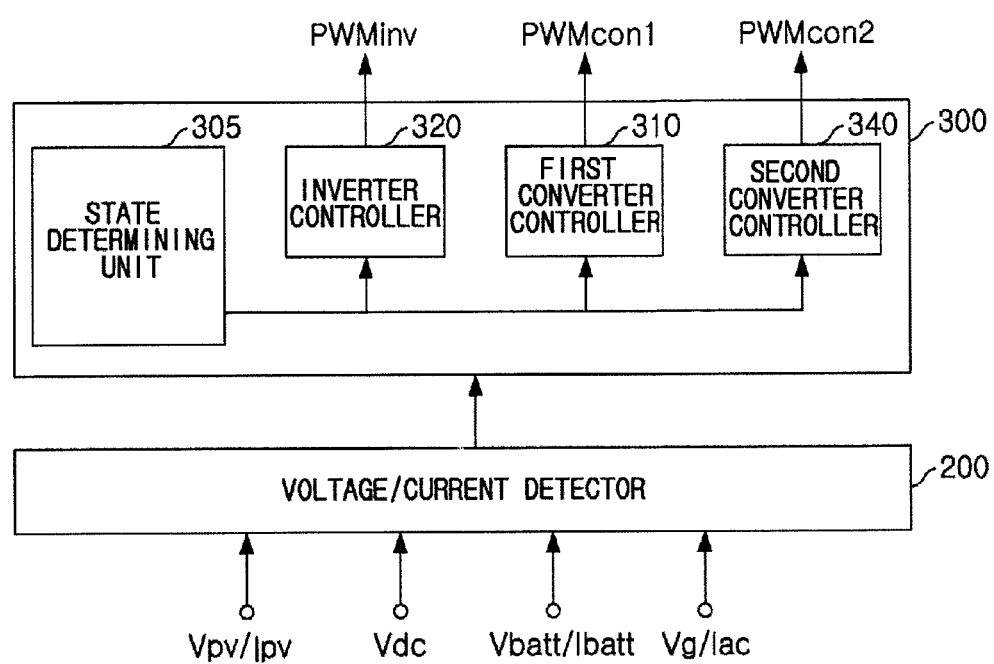
FIG. 2 is a configuration diagram of a charging control unit according to the present invention.

FIG. 2 is a configuration diagram of a charging control unit according to the present invention.

Referring to FIG. 2, the charging control unit 300 may include a state determining unit 305 that determines any of the predetermined first to fourth operating modes based on the amount of photovoltaic power produced by the solar cell and the connection or not of the battery by using the PV voltage/current Vpv/Ipv detected in the voltage/current detector 200 and the battery voltage/current Vbatt/Ibatt, a first converter controller 310 that controls the first DC/DC converter 110 according to the operating mode determined in the state determining unit 305, an inverter controller 320 that controls the DC/AC inverter 120 according to the operating mode determined in the state determining unit 305, and a second converter controller 340 that controls the second DC/DC converter 140 according to the operating mode determined in the state determining unit 305.

In this case, the first DC/DC converter 100 may be implemented as a boost DC/DC converter, including a coil, a switch, and a diode.

The DC/AC inverter 120 may be implemented as an H-bridge structure such as a full-bridge or a half-bridge, or the like and performs the DC voltage/system voltage (DC/AC) conversion according to the second DC/DC control when a phase of output current Iac is the same as a phase of a system.

The second DC/DC converter 140 may be implemented as, for example, a buck-boost type. When the second DC/DC converter 140 is implemented as the buck-boost type, it can perform the bi-directional conversion, that is, the boost conversion in one direction and the buck conversion in an opposite direction.

FIGS. 3A through 3D are flow charts of power transfer in each of the first to fourth operating modes according to the present invention.

Figure 3A:
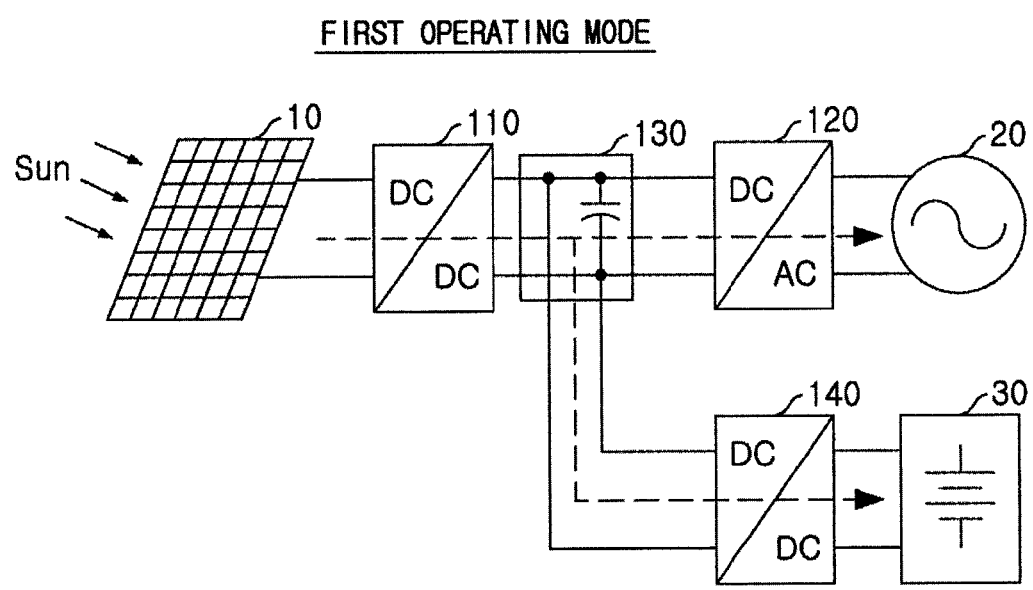
FIGS. 3A through 3D are flow charts showing power transfer in each of the first to fourth operating modes according to the present invention.

Referring to FIG. 3A, the charging control unit 300 may be configured to control the first DC/DC converter 110, the DC/AC inverter 120, and the second DC/DC converter 140 in order to charge the battery 30 by using the photovoltaic energy of the solar cell 10 in the first operating mode.

Figure 3B:
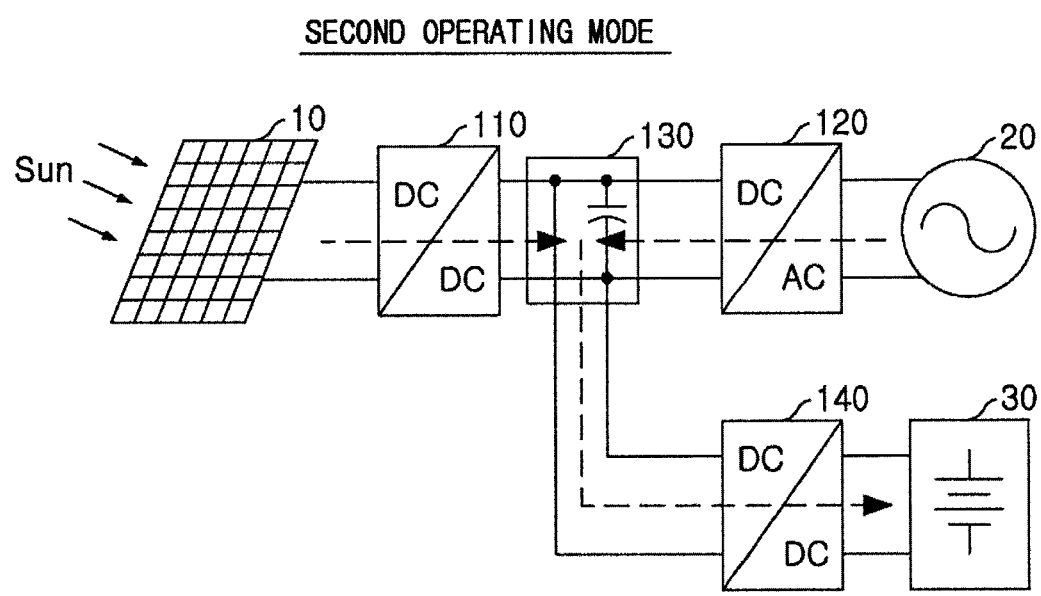

Referring to FIG. 3B, the charging control unit 300 may be configured to control the first DC/DC converter 110, the DC/AC inverter 120, and the second DC/DC converter 140 in order to charge the battery 30 by using the photovoltaic energy of the solar cell 10 and the voltage of the system 20 in the second operating mode.

Figure 3C:
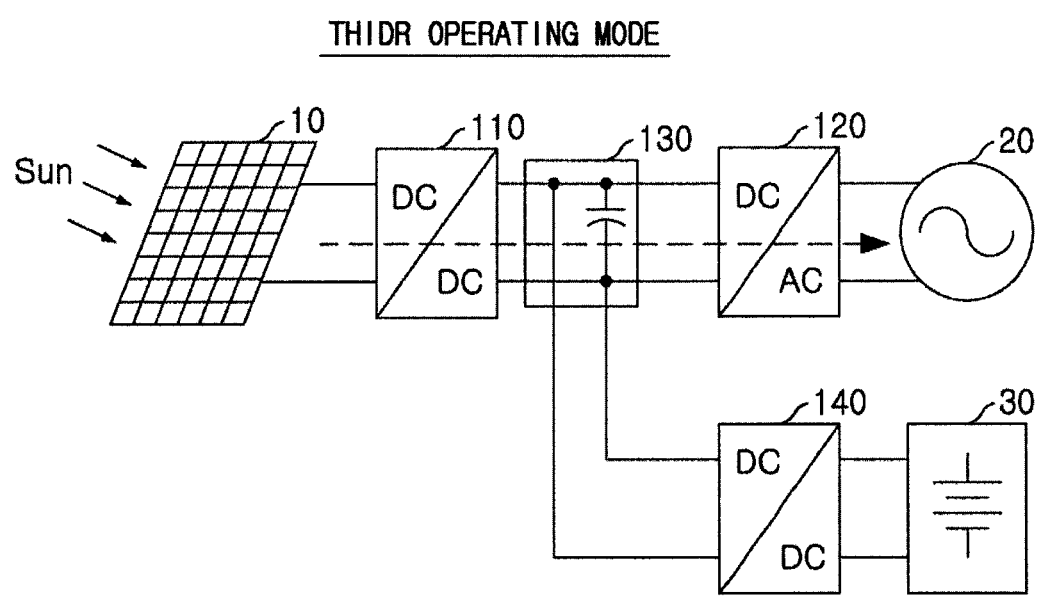

Referring to FIG. 3C, the charging control unit 300 may be configured to control the first DC/DC converter 110, the DC/AC inverter 120, and the second DC/DC converter 140 in order to charge the battery 30 by using the voltage of the system 20 in the third operating mode.

Figure 3D:
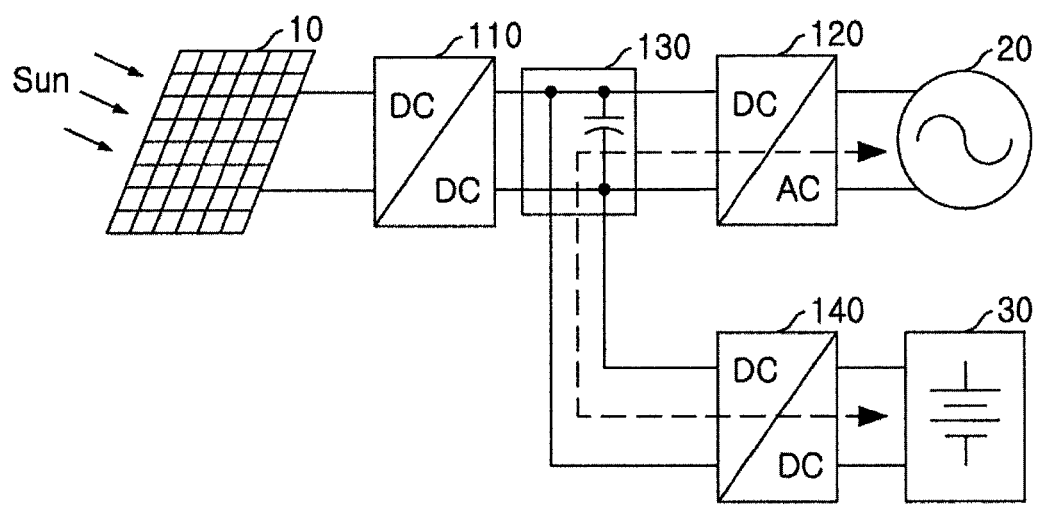

Referring to FIG. 3D, the charging control unit 300 may be configured to control the first DC/DC converter 110, the DC/AC inverter 120, and the second DC/DC converter 140 in order to transfer the photovoltaic energy of the solar cell 10 to the system 20 in the fourth operating mode.

Figure 4:
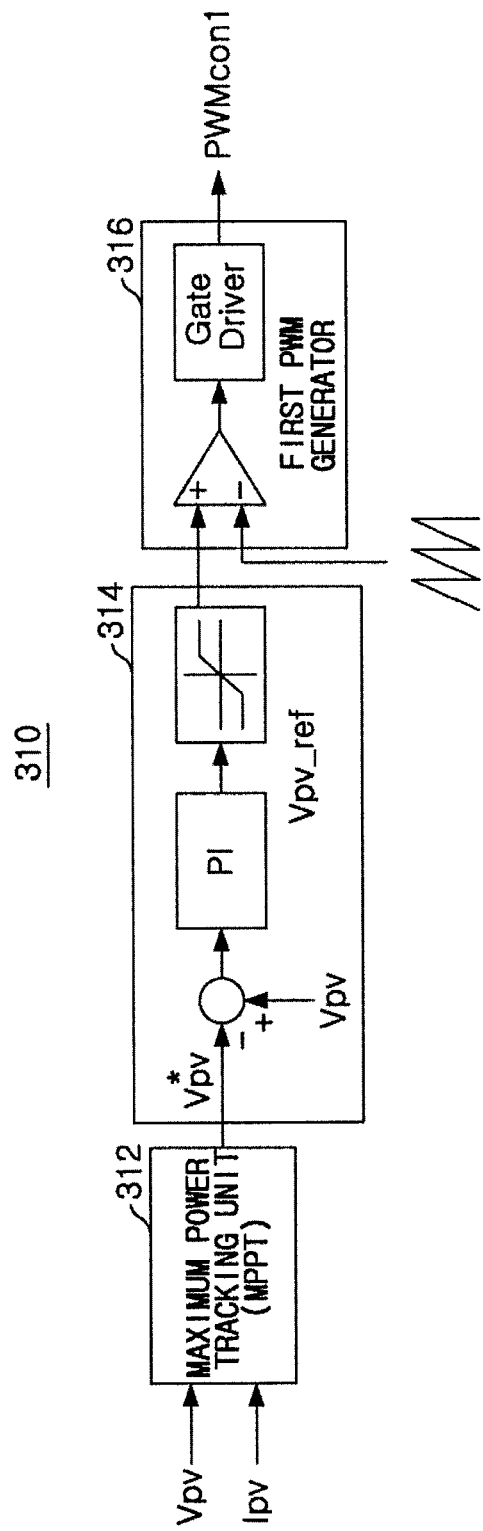
FIG. 4 is an internal block diagram of a first converter controller of the present invention.

FIG. 4 is an internal block diagram of the first converter controller of the present invention.

Referring to FIG. 4, the first converter controller 310 may include a maximum power point tracking unit 312 that tracks a predetermined maximum power point by using the PV output voltage Vpv and the PV current Ipv to generate a PV output voltage command value V*pv, a first voltage control unit 314 that compensates for a predetermined PV output voltage control value Vpv_ref by using error voltage between the PV output voltage command value V*pv from the maximum power point tracking unit 312 and the PV output voltage Vpv, and a first converter PWM generator 316 that generates a first converter PWM signal PWM con1 based on the PV output voltage control value Vpv_ref compensated in the first voltage control unit 314.

Figure 5:
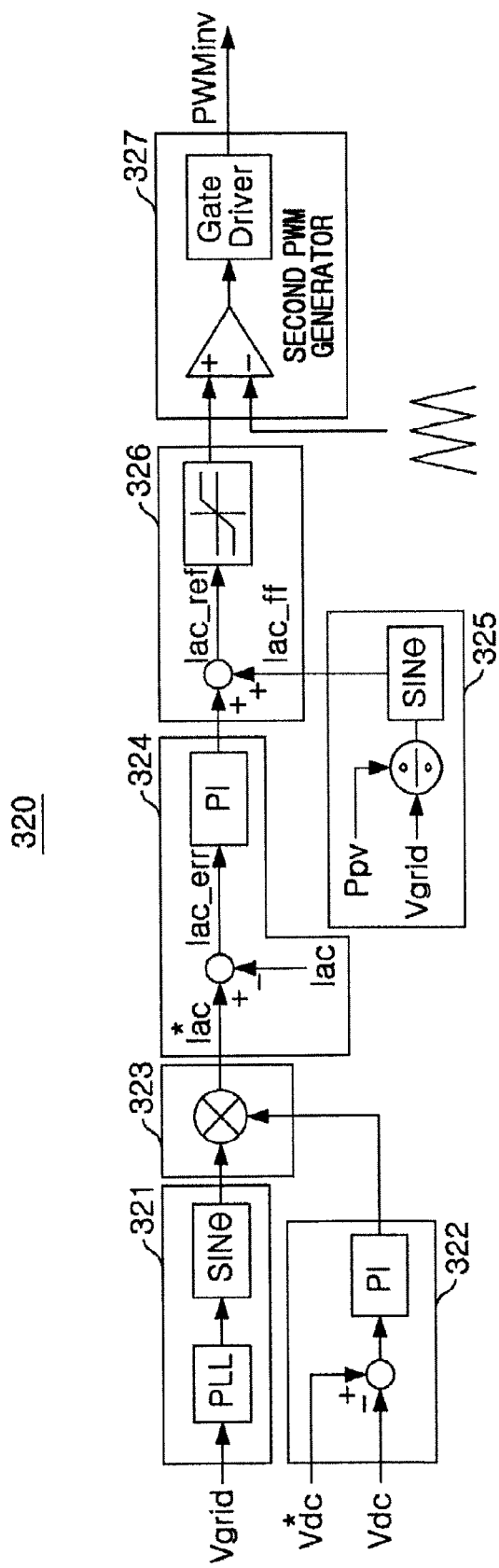
FIG. 5 is an internal block diagram of an inverter controller of the present invention.

FIG. 5 is an internal block diagram of an inverter controller of the present invention.

Referring to FIG. 5, the inverter controller 320 may include a system phase detector 321 that detects the phase of the system voltage and generates the phase signal having the detected phase, a DC link voltage control unit 322 that compensates for a predetermined DC link voltage control value Vdc_ref by using error voltage between the DC link voltage Vdc and the predetermined DC link voltage command value V*dc, a signal converter 323 that generates the AC command value I*ac by multiplying the DC link voltage control value Vdc_ref compensated in the DC link voltage control unit 322 by the phase signal of the system phase detector 321, a first current control unit 324 that compensates for the predetermined AC control value Iac_ref by using the error current Iac_err between the AC command value I*ac from the signal converter 323 and the detected AC Iac, a current feed-forward compensator 325 that generates the phase signal based on a value generated by dividing the PV power Ppv determined by the PV voltage/current Vpv/Ipv by the system voltage Vg, a current compensator 326 that compensates for the AC control value Iac_ref from the first current control unit 324 in synchronization with the phase signal from the current feed-forward compensator 325, and an inverter PWM generator 327 that generates the inverter PWM signal PWMinv based on the AC control value Iac_ref compensated in the current compensator 326.

Figure 6:
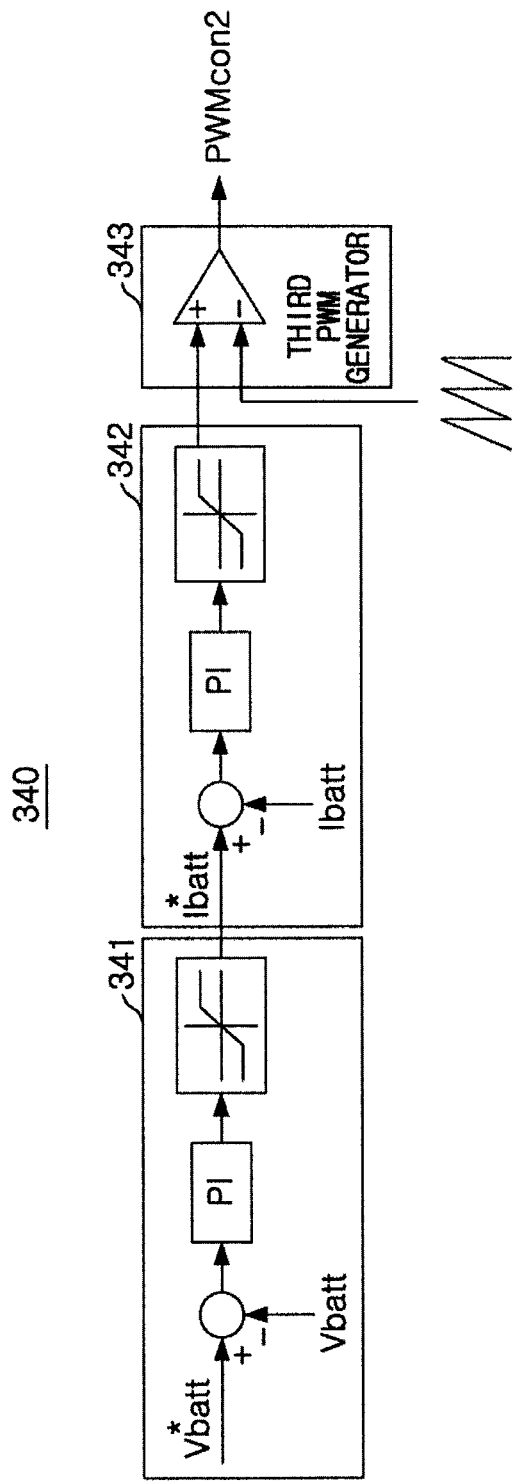
FIG. 6 is an internal block diagram of a second converter controller of the present invention.

FIG. 6 is an internal block diagram of the second converter controller of the present invention.

Referring to FIG. 6, the second converter controller 340 may include a voltage controller 242 that compensates for a predetermined battery current command value I*batt by using the error voltage between the battery voltage Vbatt and the predetermined battery voltage command value V*batt, a current control unit 344 that compensates for a predetermined battery current control value Ibatt_ref by using the error current between the battery current command value I*batt compensated in the voltage control unit 342 and the detected battery current Ibatt, and a second converter PWM generator 346 that generates a second converter PWM signal PWM-con2 by using the battery current control value Ibatt_ref compensated in the current control unit 344.

Figure 7:
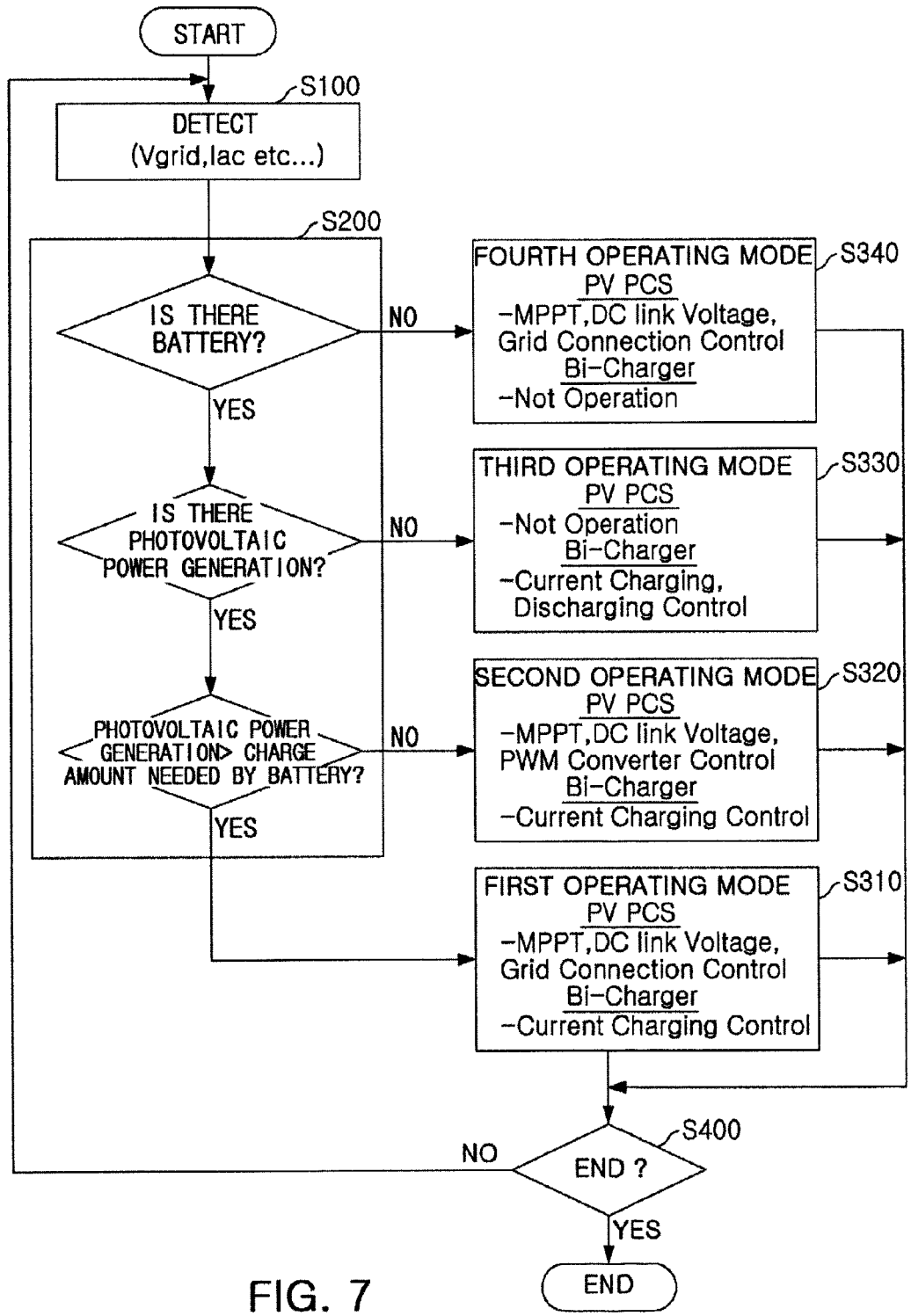
FIG. 7 is a flow chart of a method for charging and discharging a photovoltaic PCS integrated battery according to the present invention.

FIG. 7 is a flow chart of a method for charging and discharging a photovoltaic PCS integrated battery according to the present invention.

Referring to FIG. 7, a method for charging and discharging a photovoltaic PCS integrated battery according to the present invention may be applied to the system as shown in FIG. 1.

Referring to FIGS. 1 and 7, the method for charging and discharging the photovoltaic PCS integrated battery according to the present invention may include a detecting step S100 that detects PV voltage/current Vpv/Ipv detected in a predetermined node, battery voltage/current Vbatt/Ibatt, system voltage/current Vg/Iac, and DC link voltage Vdc, a state determining step S200 that determines any of predetermined first to fourth operating modes based on the amount of photovoltaic power produced by a solar cell and the connection or not of the battery by using the PV voltage/current Vpv/Ipv and the battery voltage/current Vbatt/Ibatt, a first control step S310 that controls the charging of the battery 30 by using the photovoltaic energy of the solar cell 10 in the first operating mode, a second control step S320 that controls the first DC/DC converter 10, the DC/AC inverter 120, and the second DC/DC converter 140 to charge the battery 30 by using the photovoltaic energy of the solar cell 10 and the voltage of the system 20 in the second operating mode, and a third control step S330 that controls the first DC/DC converter 110, the DC/AC inverter 120, and the second DC/DC converter 140 to charge the battery 30 by using the voltage of the system 20 in the third operating mode.

Further, the method for charging and discharging the battery may further include a fourth control step S340 controlling the first DC/DC converter 110, the DC/AC inverter 120, and the second DC/DC converter 140 in order to transfer the photovoltaic energy of the solar cell 10 to the system 20 in the fourth operating mode.

In addition, the method for charging and discharging the battery according to the present invention may further include an end determining step S400. If it is determined that the method for charging and discharging the battery ends at the end determining step S400, the operation of the present invention ends and if not, the method for charging and discharging the battery may proceed to the detecting step S100.

Referring to FIGS. 1 and 7, the state determining step 305 may be made to determine a first control mode when the amount of photovoltaic power produced by the solar cell 10 is higher than the charge amount needed in the battery 30 in a state in which the battery 10 is connected, based on the amount of photovoltaic power produced by the solar cell and the connection or not of the battery by using the PV voltage/current and the battery voltage/current, determine a second control mode when the amount of photovoltaic power produced by the solar cell 10 is not higher than the charge amount needed in the battery 30 in the state in which the battery 10 is connected, determine a third control mode when there is photovoltaic power produced by the solar cell 10 in the state in which the battery 10 is connected, and determine a fourth operating mode in the state in which the battery 30 is not connected.

Herein, the amount of photovoltaic power produced by the solar cell 10 can be appreciated from the PV power Ppv that can be calculated from the PV voltage/current Vpv/Ipv of the solar cell 10. The charge amount needed in the battery 30 may be previously set to be adapted to the applied system. The connection state or not of the battery 10 can be understood based on the battery voltage/current Vbatt/Ibatt.

The first control step may be configured to control the maximum power point tracking (MPPT), the DC link voltage and the system link and control the current charging through the second DC/DC converter 140 by using the DC/DC converter 110 and the DC/AC inverter 120.

The second control step may be configured to control the maximum power point tracking (MPPT), the DC link voltage, and the PWM converter and control the current charging through the second DC/DC converter 140 by using the DC/DC converter 110 and the DC/AC inverter 120.

The third control step may be configured to stop the operation of the DC/DC converter 110 and control the current charging and the current discharging by using the DC/AC inverter 120 and the second DC/DC converter 140.

The fourth control step may be configured to control the maximum power point tracking (MPPT), the DC link voltage and the system link and control the operation stop of the second DC/DC converter 140 by using the DC/DC converter 110 and the DC/AC inverter 120.

Figure 8:
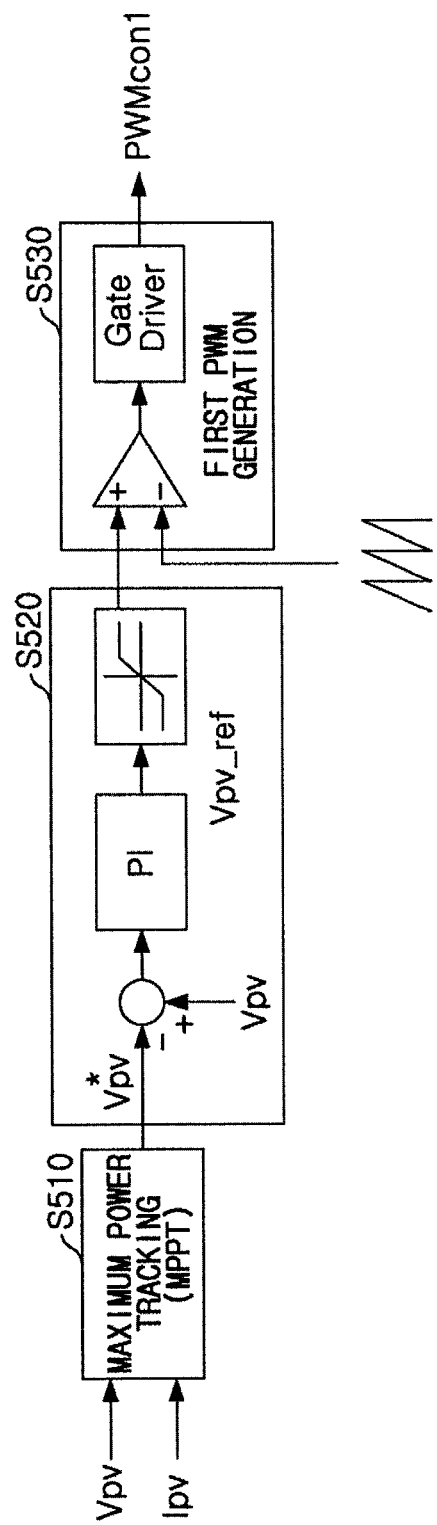
FIG. 8 is a flowchart showing a process of controlling a first converter of the present invention.

FIG. 8 is a flowchart showing a process of controlling the first converter of the present invention.

Referring to FIG. 8, the process of controlling the first converter of the first to fourth control steps may include a maximum power point tracking step S510 that performs the predetermined maximum power point tracking by using the PV output voltage Vpv and the PV current Ipv to generate the PV output voltage command value V*pv, a first voltage control step S520 that compensates for the predetermined PV output voltage control value V*pv_ref by using the error voltage between the PV output voltage command value V*pv from the maximum power point tracking step S510 and the PV detecting voltage Vpv, and a first converter PWM generating step S530 that generates the first converter PWM signal PWMcon1 based on the PV output voltage control value Vpv_ref compensated in the first voltage control step S520.

Figure 9:
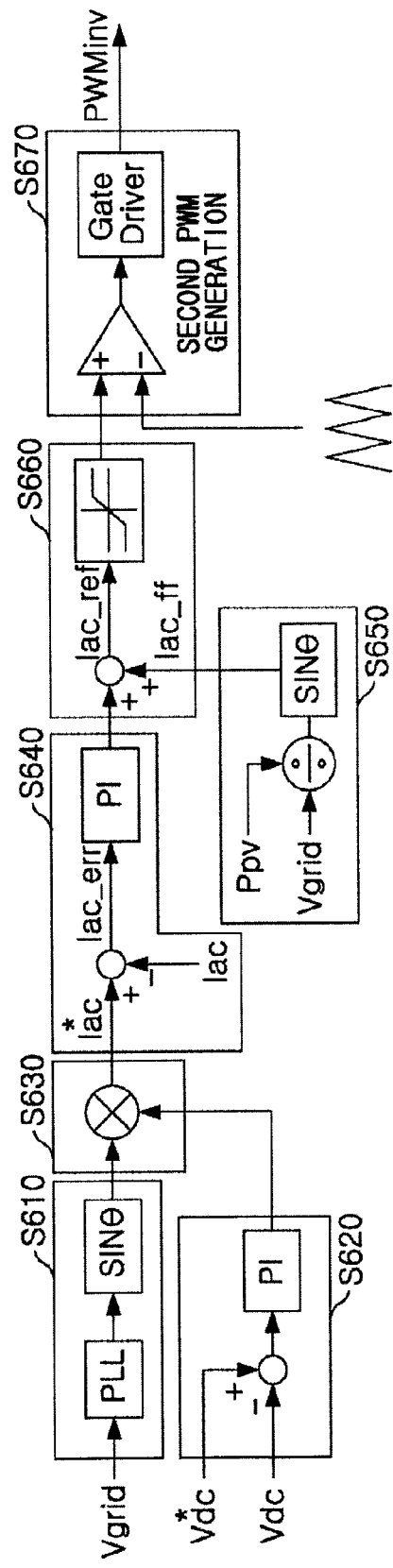
FIG. 9 is a flowchart showing a process of controlling an inverter of the present invention.

FIG. 9 is a flowchart showing a process of controlling the inverter of the present invention.

Referring to FIG. 9, a process of controlling the inverter of the first to fourth control steps may include a system phase detecting step S610 that detects the phase of the system voltage and generates the phase signal having the detected phase, a DC link voltage control step S620 that compensates for a predetermined DC link voltage control value Vdc_ref by using error voltage between the DC link voltage Vdc and the predetermined DC link voltage command value V*dc, a signal converting step S630 that generates the AC command value I*ac by multiplying the DC link voltage control value Vdc_ref compensated in the DC link voltage control step S620 by the phase signal of the system phase detecting step S610, a first current control step S640 that compensates for the predetermined AC control value Iac_ref by using the error current Iac_err between the AC command value I*ac from the signal converting step S630 and the detected AC Iac, a current feed-forward compensating step S650 that generates the phase signal based on a value generated by dividing the PV power Ppv determined by the PV voltage/current Vpv/Ipv by the system voltage Vg, a current compensating step S660 that compensates for the AC control value Iac_ref from the first current control step S640 in synchronization with the phase signal from the current feed-forward compensating step S650, and an inverter PWM generating step S670 that generates the inverter PWM signal PWMinv based on the AC control value Iac_ref compensated in the current compensating step S660.

Figure 10:
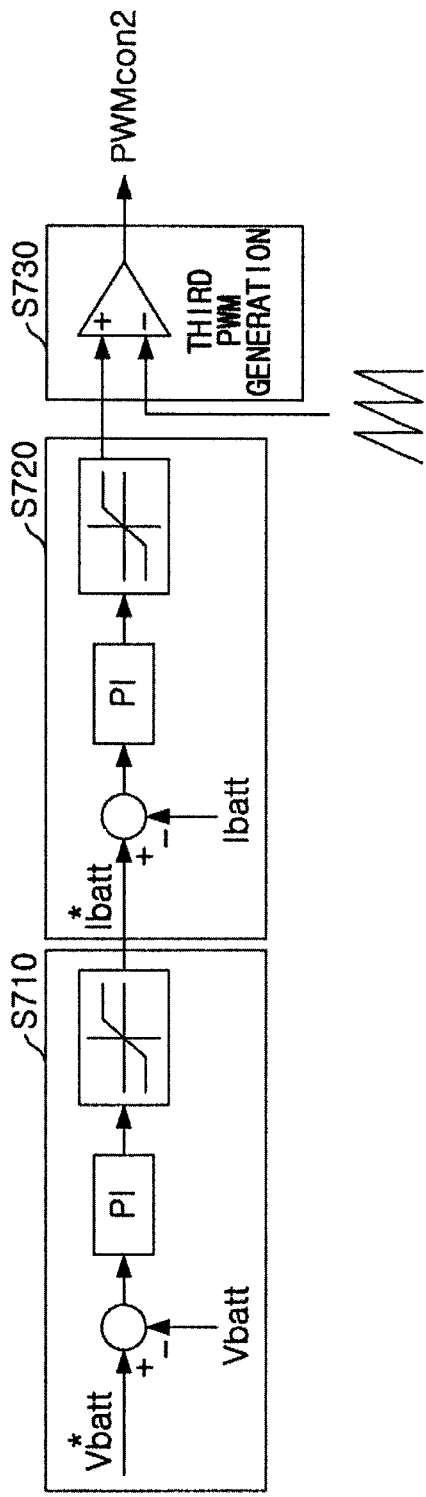
FIG. 10 is a flow chart showing a process of controlling a second converter of the present invention.

FIG. 10 is a flow chart showing a process of controlling a second converter of the present invention.

Referring to FIG. 10, a process of controlling the second converter of the first to fourth control steps may include a voltage control step S710 that compensates for a predetermined battery current command value I*batt by using the error voltage between the battery voltage Vbatt and the predetermined battery voltage command value V*batt, a current control step S720 that compensates for a predetermined battery current control value Ibatt_ref by using the error current between the battery current command value I*batt compensated in the voltage control step S710 and the detected battery current Ibatt, and a second converter PWM generating step S730 that generates a second converter PWM signal PWMcon2 by using the battery current control value Ibatt_ref compensated in the current control step S720.

Figure 11:
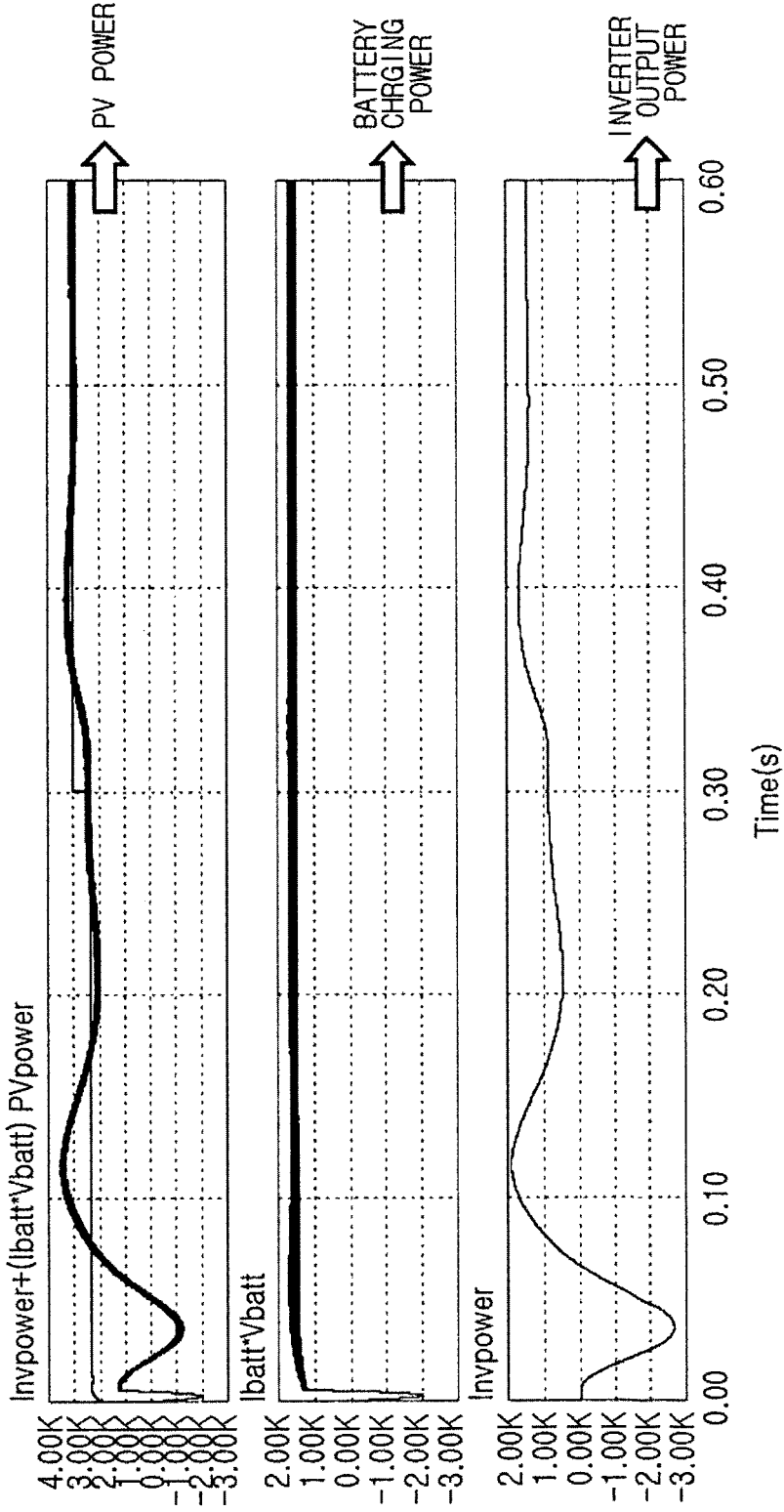
FIG. 11 is a power graph in a first operating mode of the present invention.

FIG. 11 is a power graph in a first operating mode of the present invention.

It can be appreciated from the power graph in the first operating mode shown in FIG. 11 that since the amount of photovoltaic power produced by the solar cell 10 is higher than the charge amount required for the battery 30 in the state in which the battery 10 is connected, the PV power is provided as the charging power of the battery and the output power of the inverter.

Figure 12:
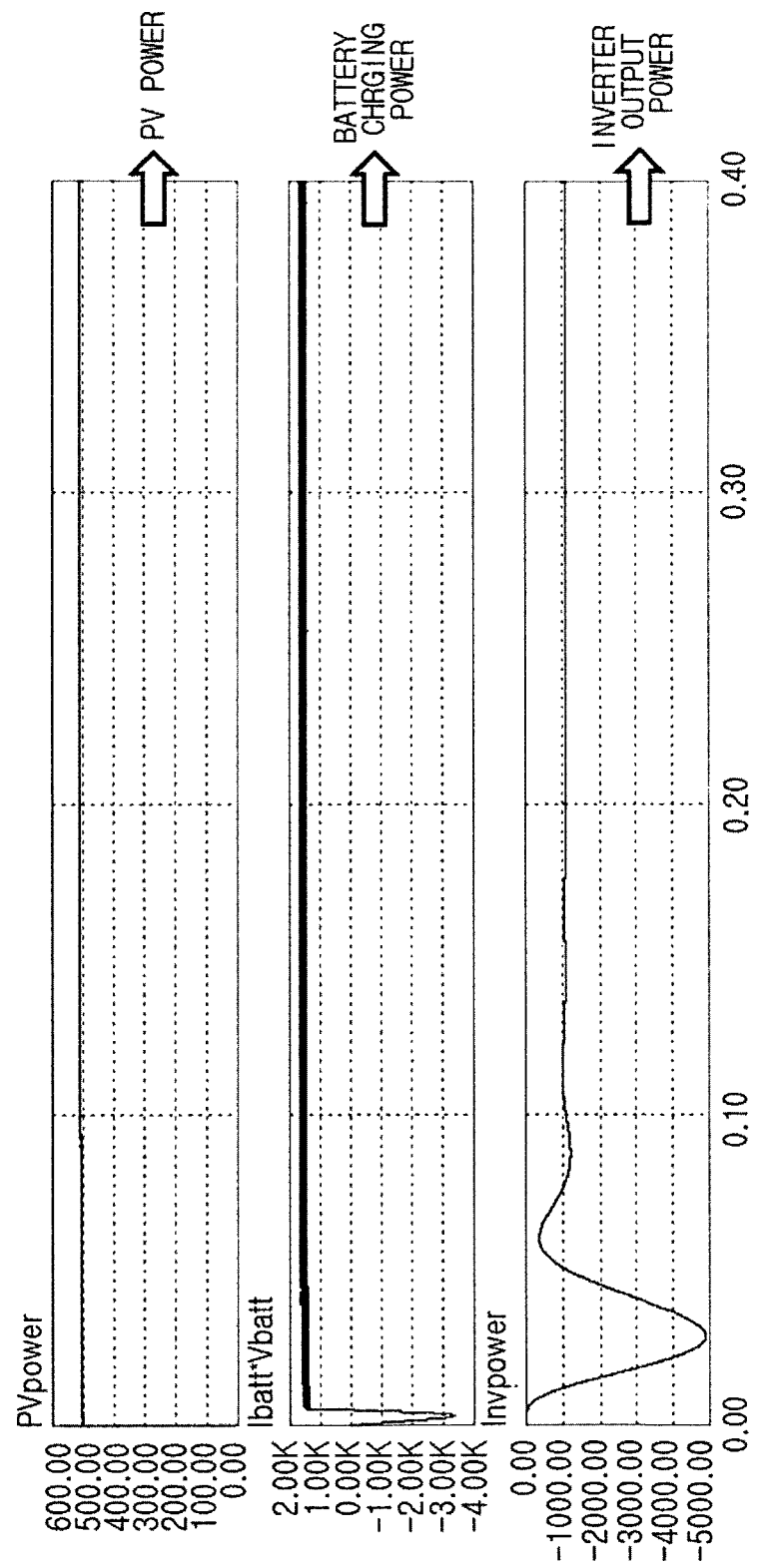
FIG. 12 is a power graph in a second operating mode of the present invention.

FIG. 12 is a power graph in a second operating mode of the present invention.

It can be appreciated from the power graph in the second operating mode shown in FIG. 12 that since the amount of photovoltaic power produced by the solar cell 10 is not higher than the charge amount required for the battery 30 in the state in which the battery 10 is connected, the PV power and the system power are provided as the charging power of the battery.

Figure 13:
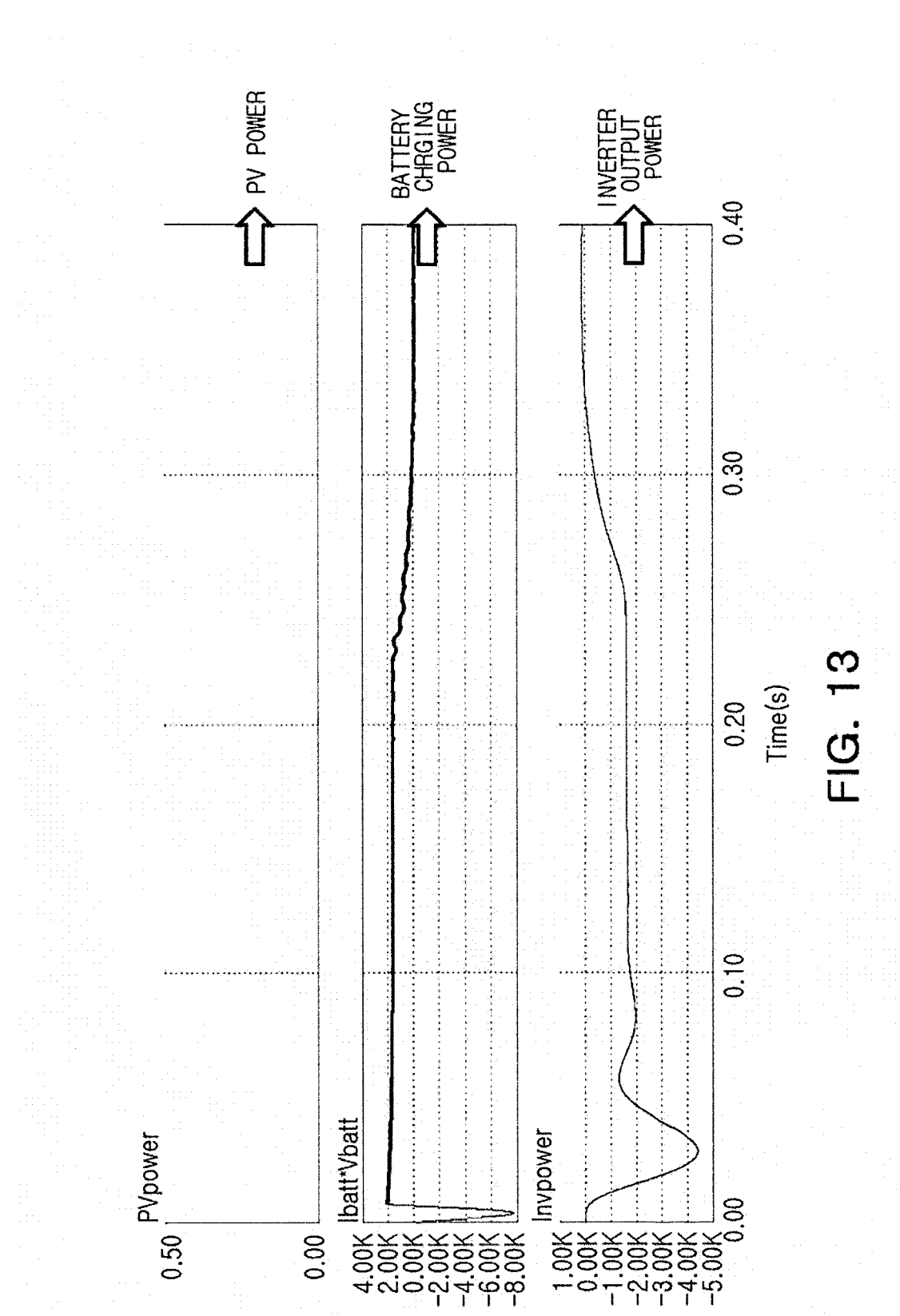
FIG. 13 is a power graph in a third operating mode of the present invention.

FIG. 13 is a power graph in a third operating mode of the present invention.

It can be appreciated from the power graph in the third operating mode shown in FIG. 13 that since there is photovoltaic power produced by the solar cell 10 in the state in which the battery 10 is connected, the system power is provided as the charging power of the battery or the battery power is provided to the system.

Hereinafter, the operations and effects of the present invention will be described in detail with reference to the accompanying drawings.

The apparatus for charging and discharging the photovoltaic PCS integrated battery according to the present invention will be described with reference to FIGS. 1 and 6.

First, in FIG. 1, the apparatus for charging and discharging the photovoltaic PCS integrated battery according to the present invention includes the first DC/DC converter 110 that is connected to the solar cell 10, the DC/AC inverter 120 that is connected to the system 20, the DC link unit 130 that is connected in common to the output terminal of the first DC/DC converter 110 and the output terminal of the DC/AC inverter 120, and the second DC/DC converter 140 that has the bidirectional DC/DC conversion function connected between the DC link unit 130 and the battery 30.

In addition, the apparatus for charging and discharging the photovoltaic PCS integrated battery according to the present invention includes the voltage/current detector 200 and the charging control unit 300.

In this case, the voltage/current detector 200 detects the PV voltage/current Vpv/Ipv of the solar cell 10, the battery voltage/current Vbatt/Ibatt of the battery 30, the system voltage/current Vg/Iac of the system 20, and the DC link voltage Vdc of the DC link unit 130.

The charging control unit 300 determines one of the plurality of predetermined control modes based on the voltage and current detected in the voltage/current detector 200 and can control the first DC/DC converter 110, the second DC/DC converter, and the DC/AC inverter according to the determined control mode.

For example, the charging control unit 300 may calculate the energy of photovoltaic power produced by the solar cell 10 based on the voltage and current detected in the voltage/current detector 200 and determine one of the predetermined first to fourth control modes according to the amount of photovoltaic power produced by the solar cell and the connection or not of the battery.

Referring to FIG. 2, a state determining unit 305 of the charging control unit 300 uses the PV voltage/current Vpv/Ipv and the battery voltage/current Vbatt/Ibatt detected in the voltage/current detector 200 to determine any of the predetermined first to fourth operating modes based on the amount of photovoltaic power produced by the solar cell and the connection or not of the battery.

The first converter controller 310 of the charging control unit 300 controls the first DC/DC converter 110 according to the operating mode determined in the state determining unit 305.

In addition, the inverter controller 320 of the charging control unit 300 controls the DC/AC inverter 120 according to the operating mode determined in the state determining unit 305.

The second converter controller 340 of the charging control unit 300 controls the second DC/DC converter 140 according to the operating mode determined in the state determining unit 305.

Meanwhile, the state determining unit 305 may determine a first control mode when the amount of photovoltaic power produced by the solar cell 10 is higher than the charging amount needed in the battery 30 in a state in which the battery 10 is connected, based on the amount of photovoltaic power produced by the solar cell and the connection or not of the battery by using the PV voltage/current and the battery voltage/current, determine a second control mode when the amount of photovoltaic power produced by the solar cell 10 is not higher than the charging amount needed in the battery 30 in the state in which the battery 10 is connected, determine a third control mode when there is no photovoltaic power produced by the solar cell 10 in the state in which the battery 10 is connected, and determine a fourth operating mode in the state in which the battery 30 is not connected.

Referring to FIG. 3A, the charging control unit 300 may control the first DC/DC converter 110, the DC/AC inverter 120, and the second DC/DC converter 140 in order to charge the battery 30 by using the photovoltaic energy of the solar cell 10 in the first operating mode.

Referring to FIG. 3B, the charging control unit 300 may control the first DC/DC converter 110, the DC/AC inverter 120, and the second DC/DC converter 140 in order to charge the battery 30 by using the photovoltaic energy of the solar cell 10 and the voltage of the system 20 in the second operating mode.

Referring to FIG. 3C, the charging control unit 300 may control the first DC/DC converter 110, the DC/AC inverter 120, and the second DC/DC converter 140 in order to charge the battery 30 by using the voltage of the system 20 in the third operating mode.

Referring to FIG. 3D, the charging control unit 300 may control the first DC/DC converter 110, the DC/AC inverter 120, and the second DC/DC converter 140 in order to transfer the photovoltaic energy of the solar cell 10 to the system 20 in the fourth operating mode.

Referring to FIG. 4, the maximum power point tracking unit 312 of the first converter controller 310 uses the PV output voltage Vpv and the PV current Ipv to track the predetermined maximum power point, thereby generating the PV output voltage command value V*pv and providing it to the first voltage control unit 314.

The first voltage control unit 314 uses the error voltage between the PV output command value V*pv and the PV detecting voltage Vpv to compensate for the predetermined PV output voltage control value Vpv_ref and provide it to the first converter PWM generator 316.

The first converter PWM generator 316 generates the first converter PWM signal PWMcon1 based on the PV output voltage control value Vpv_ref compensated in the first voltage control unit 314 and outputs it to the first converter PWM signal PWMcon1.

Therefore, the first converter controller 310 uses the first converter PWM signal PWMcon1 to control the operation of the first DC/DC converter 110, thereby controlling the flow of power corresponding to the determined control mode among the first to fourth control modes.

Referring to FIG. 5, the system phase detector 321 of the inverter controller 320 detects the phase of the system voltage, generates the phase signal having the detected phase, and provides the generated phase signal to the signal converter 323.

The DC link voltage control unit 322 of the inverter controller 320 uses the error voltage between the DC link voltage Vdc and the predetermined DC link voltage command value V*dc to compensate for the predetermined DC link voltage control value Vdc_ref and provide it to the signal converter 323.

The signal converter 323 multiples the DC link voltage control value Vdc_ref compensated in the DC link voltage control unit 322 by the phase signal of the system phase detector 321 to generate the AC command value I*ac and provide it to the first current control unit 324.

The first current control unit 324 uses the error current Iac_err between the AC command value I*ac from the signal converter 323 and the detected AC Iac to compensate for the predetermined AC control value Iac_ref and provide it to the current compensator 326.

The current feed-through compensator 325 of the inverter controller 320 generates the phase signal based on a value generated by dividing the PV power Ppv determined by the PV voltage/current Vpv/Ipv by the system voltage Vg and provides it to the current compensator 326.

The current compensator 326 compensates for the AC control value Iac_ref from the first current control unit 324 in synchronization with the phase signal from the current feed-through compensator 325 and provides it to the inverter PWM generator 327.

The inverter PWM generator 327 generates the inverter PWM signal PWMinv based on the AC control value Iac_ref compensated in the current compensator 326 and outputs it to the DC/AC inverter 120.

Therefore, the inverter controller 320 uses the inverter PWM signal PWMinv to control the DC/AC inverter 120, thereby controlling the flow of power corresponding to the determined control mode among the first to fourth control modes.

Referring to FIG. 6, the voltage controller 342 of the second converter controller 340 uses the error voltage between the battery voltage Vbatt and the predetermined battery voltage command value V*batt to compensate for the predetermined battery current command value I*batt and provide it to the current control unit 344.

The current control unit 344 uses the error current between the battery current command value I*batt compensated in the voltage control unit 342 and the detected battery current Ibatt to compensate for the predetermined battery current control value Ibatt_ref and provide it to the second converter PWM generator 346.

Further, the second converter PWM generator 346 uses the battery current control value Ibatt_ref compensated in the current control unit 344 to generate the second converter PWM signal PWMcon2 and provide it to the second DC/DC converter 140.

Therefore, the second converter controller 340 uses the second converter PWM signal PWMcon2 to control the operation of the second DC/DC converter 140, thereby controlling the flow of power corresponding to the control mode determined among the first to fourth control modes.

The method for charging and discharging the photovoltaic PCS integrated battery according to the present invention will now be described with reference to FIGS. 1, 3, and 7 through 10.

Referring first to FIG. 7, the method for charging and discharging the photovoltaic PCS integrated battery according to the present invention may be applied to the system as shown in FIG. 1.

Referring to FIGS. 1, 3, and 7, in the method for charging and discharging the photovoltaic PCS integrated battery, the detecting step S100 of the present invention shown in FIG. 7 detects the PV voltage/current Vpv/Ipv detected in the predetermined node, the battery voltage/current Vbatt/Ibatt, the system voltage current Vg/Igc, and the DC link voltage Vdc.

At the state determining step S200 of the present invention uses the PV voltage/current Vpv/Ipv and the battery voltage/current Vbatt/Ibatt to determine any of the predetermined first to fourth operating modes based on the amount of photovoltaic power produced by the solar cell and the connection or not of the battery.

Referring to FIG. 3A, a first control step S310 of the present invention uses the photovoltaic energy of the solar cell 10 in the first operating mode to control the charging of the battery 30.

Referring to FIG. 3B, a second control step S320 of the present invention uses the photovoltaic energy of the solar cell 10 and the voltage of the system 20 in the second operating mode to control the first DC/DC converter 110, the DC/AC inverter 120, and the second DC/DC converter 140, thereby charging the battery 30.

Referring to FIG. 3C, a third control step S330 of the present invention uses the voltage of the system 20 in the third operating mode to control the first DC/DC converter 110, the DC/AC inverter 120, and the second DC/DC converter 140, thereby charging the battery 30.

Referring to FIG. 3D, a fourth control step S340 of the present invention may control the first DC/DC converter 110, the DC/AC inverter 120, and the second DC/DC converter 140 in order to transfer the photovoltaic energy of the solar cell 10 to the system 20 in the fourth operating mode.

Referring to FIGS. 1 and 7, the state determining step 305 may determine a first control mode when the amount of photovoltaic power produced by the solar cell 10 is higher than the charging amount needed in the battery 30 in a state in which the battery 10 is connected, based on the amount of photovoltaic power produced by the solar cell and the connection or not of the battery by using the PV voltage/current and the battery voltage/current, determine a second control mode when the amount of photovoltaic power produced by the solar cell 10 is not higher than the charging amount needed in the battery 30 in the state in which the battery 10 is connected, determine a third control mode when there is no photovoltaic power of the solar cell 10 in the state in which the battery 10 is connected, and determine a fourth operating mode in the state in which the battery 30 is not connected.

The first control step may control the maximum power point tracking (MPPT), the DC link voltage and the system link and control the current charging through the second DC/DC converter 140 by using the DC/DC converter 110 and the DC/AC inverter 120.

The second control step may control the maximum power point tracking (MPPT), the DC link voltage, and the PWM converter and control the current charging through the second DC/DC converter 140 by using the DC/DC converter 110 and the DC/AC inverter 120.

The third control step may stop the operation of the DC/DC converter 110 and control the current charging and the current discharging by using the DC/AC inverter 120 and the second DC/DC converter 140.

The fourth control step may control the maximum power point tracking (MPPT), the DC link voltage and the system link and control the operation stop of the second DC/DC converter 140, by using the DC/DC converter 110 and the DC/AC inverter 120.

Referring to FIG. 8, in the first converter control process of the first to fourth steps, a maximum power point tracking step S510 first uses the PV output voltage Vpv and the PV current Ipv to track the predetermined maximum power point, thereby generating the PV output voltage command value P*pv.

Next, a first voltage control step S520 uses the error voltage between the PV output voltage command value V*pv from the maximum power point tracking step S510 and the PV detecting voltage Vpv to compensate for the predetermined PV output voltage control value Vpv_ref.

A first converter PWM generating step S530 generates the first converter PWM signal PWMcon1 based on the PV output voltage control value Vpv_ref compensated in the first voltage control step S520.

Therefore, the process of controlling the first converter uses the first converter PWM signal PWMcon1 to control the operation of the first DC/DC converter 110, thereby making it possible to control the flow of power corresponding to the control mode determined among the first to fourth control modes.

Referring to FIG. 9, in the process of controlling the inverter according to the first to fourth control steps, a system phase detecting step S610 first detects the phase of the system voltage and generates the phase signal having the detected phase.

A DC link voltage control step S620 of the present invention uses the error voltage between the DC link voltage Vdc and the predetermined DC link voltage command value V*dc to compensate for the predetermined DC link voltage control value Vdc_ref.

Next, a signal converting step S630 of the present invention multiples the DC link voltage control value Vdc_ref compensated at the DC link voltage control step S620 by the phase signal of the system phase detecting step S610, thereby generating the AC command value I*ac.

Next, the first current control step S640 of the present invention compensates for the predetermined AC control value Iac_ref by using the error current Iac_err between the AC command value I*ac from the signal converting step S630 and the detected AC Iac.

Meanwhile, the current feed-through compensating step S650 of the present invention generates the phase signal based on the value generated by dividing the PV power Ppv determined by the PV voltage/current Vpv/Ipv by the system voltage Vg.

Next, the current compensating step S660 of the present invention compensates for the AC control value Iac_ref from the first current control step S640 in synchronization with the phase signal from the current feed-through compensating step S650.

The inverter PWM generating step S670 of the present invention generates the inverter PWM signal PWMinv based on the AC control value Iac_ref compensated at the current compensating step S660.

Therefore, the process of controlling the inverter uses the inverter PWM signal PWMinv to control the DC/AC inverter 120, thereby controlling the flow of power corresponding to the determined control mode among the first to fourth control modes.

Referring to FIG. 10, in the process of controlling the second converter of the first to fourth control step, the voltage control step S710 of the present invention first uses the error voltage between the battery voltage Vbatt and the predetermined battery voltage command value V*batt to compensate for the predetermined battery current command value I*batt.

Next, the current control step S720 of the present invention uses the error current between the battery current command value I*batt compensated at the voltage control step S710 and the detected battery current Ibatt to compensate for the predetermined battery current control value Ibatt_ref.

The second converter PWM generating step S730 of the present invention uses the battery current control value Ibatt_ref compensated at the current control step S720 to generate the second converter PWM signal PWMcon2.

Therefore, the process of controlling the second converter uses the second converter PWM signal PWMcon2 to control the operation of the second DC/DC converter 140, thereby controlling the flow of power corresponding to the control mode determined among the first to fourth control modes.

It can be appreciated from the power graph in the first operating mode shown in FIG. 11 that since the amount of photovoltaic power produced by the solar cell 10 is higher than the charge amount required for the battery 30 in the state in which the battery 10 is connected, the PV power is provided as the charging power of the battery and the output power of the inverter.

It can be appreciated from the power graph in the second operating mode shown in FIG. 12 that since the amount of photovoltaic power produced by the solar cell 10 is not higher than the charge amount required for the battery 30 in the state in which the battery 10 is connected, the PV power and the system power are provided as the charging power of the battery.

It can be appreciated from the power graph in the third operating mode shown in FIG. 13 that since there is no photovoltaic power produced by the solar cell 10 in the state in which the battery 10 is connected, the system power is provided as the charging power of the battery or the battery power is provided to the system.

As described above, the present invention provides a new type of a photovoltaic PCS integrated battery charger topology in which the above-mentioned PV PCS is combined with the battery charger and the structure of the photovoltaic PCS integrated battery charger topology has a type in which the bidirectional battery charger is combined with the DC link between the converter and the inverter in the photovoltaic PCS type in parallel.

Thereby, the power supply of the battery charger has the advantage of using sunlight, a clean energy source, transferring power to the system by using the PV PCS function and performing battery charging, and transferring the power of the battery to the system when there is no photovoltaic output. In addition, since two systems may be implemented as a single system, the present invention remarkably reduces the volume and cost thereof.

In addition, the present invention proposes the charging and discharging control algorithm for the apparatus for charging and discharging photovoltaic PCS integrated battery that can perform photovoltaic power generation, use the photovoltaic energy and the system power to charge the battery, discharge the battery energy and transfer it to the system.

As set forth above, the present invention can combine the photovoltaic PCS with the battery charger to charge the battery using photovoltaic energy and/or system voltage and supply photovoltaic energy or battery voltage to the system.

In other words, the present invention provides the photovoltaic PCS integrated battery charger topology in a type of a combination of the PV PCS with the battery charger to combine the bidirectional battery charger with the DC link stage between the converter and the inverter in the photovoltaic PCS type in parallel, such that it can basically use sunlight, a clean energy source, as the power supply of the battery charger, transfer power to the system by the PV PCS function, perform the function of the battery charger, and transfer power from the battery to the system when sunlight is not present, thereby making it possible to implement two systems as a single system to remarkably reduce the volume and cost thereof.

While the present invention has been shown and described in connection with the exemplary embodiments, it will be apparent to those skilled in the art that modifications and variations can be made without departing from the spirit and scope of the invention as defined by the appended claims.

What is claimed is:

1. An apparatus for charging and discharging a photovoltaic (PV) power conditioning system (PCS) integrated battery, the apparatus comprising:
    a first direct-current-to-direct-current (DC/DC) converter converting a PV voltage from a solar cell into a predetermined DC voltage according to a first DC/DC control:
    a direct-current-to-alternate-current (DC/AC) inverter connected to a system and performing a system voltage to DC voltage conversion or DC voltage to system voltage conversion according to a second DC/DC control:
    a DC link unit connected in common to an output terminal of the first DC/DC converter and an output terminal of the DC/AC inverter to stablize a DC voltage from the first DC/DC converter and a DC voltage from the DC/AC inverter;
    a second DC/DC converter connected between the DC link unit a battery to convert voltage bidirectionally according to the second DC/DC control;
    a voltage and current detector detecting PV voltage and current from the solar cell, battery voltage and current from the battery, system voltage and current from the system, and DC link voltage and current from the DC link unit; and
    a charging control unit determining one of a plurality of predetermined control modes based on the voltage and current detected in the voltage and current detector and controls the first DC/DC converter, the second DC/DC converter, and the DC/AC inverter according to the determined control mode.

2. The apparatus of claim 1, wherein the charging control unit calculates an amount of photovoltaic power produced by the solar cell based on the voltage and current detected in the voltage and current detector and determines one of first to fourth control modes according to the amount of photovoltaic power and whether or not the battery is connected.

3. The apparatus of claim 2, wherein the charging control unit includes:
    a state determining unit determining any of the predetermined first to fourth operating modes based on the amount of photovoltaic power and whether or not the battery is connected, by using the PV voltage and current and the battery voltage and current detected in the voltage and current detector;
    a first converter controller controlling the first DC/DC converter according to the operating mode determined in the state determining unit;
    an inverter controller controlling the DC/AC inverter according to the operating mode determined in the state determining unit; and
    a second converter controller controlling the second DC/DC converter according to the operating mode determined in the state determining unit.

4. The apparatus of claim 3, wherein the charging control unit controls the first DC/DC converter, the DC/AC inverter, and the second DC/DC converter to charge the battery by using the photovoltaic energy from the solar cell in the first operating mode.

5. The apparatus of claim 4, wherein the charging control unit controls the first DC/DC converter, the DC/AC inverter, and the second DC/DC converter to charge the battery by using the photovoltaic energy from the solar cell and the system voltage in the second operating mode.

6. The apparatus of claim 5, wherein the charging control unit controls the first DC/DC converter, the DC/AC inverter, and the second DC/DC converter to charge the battery by using the system voltage in the third operating mode.

7. The apparatus of claim 6, wherein the charging control unit controls the first DC/DC converter, the DC/AC inverter, and the second DC/DC converter to transfer the photovoltaic energy from the solar cell to the system in the fourth operating mode.

8. The apparatus of claim 7, wherein the first converter controller includes:
    a maximum power point tracking (MPPT) unit tracking a predetermined maximum power point by using the PV output voltage and the PV current to generate a PV output voltage command value;
    a first voltage control unit compensating for a predetermined PV output voltage control value by using error voltage between the PV output voltage command value from the MPPT unit and the PV detecting voltage $V_{pv}$; and
    a first converter pulse-width-modulation (PWM) generator generating a first converter PWM signal based on the PV output voltage control value compensated in the first voltage control unit.

9. The apparatus of claim 7, wherein the inverter controller includes:
    a system phase detector detecting the phase of the system voltage and generates the phase signal having the detected phase;
    a DC link voltage control unit compensating for a predetermined DC link voltage control value by using error voltage between the DC link voltage and the predetermined DC link voltage command value;
    a signal converter generating the AC command value by multiplying the DC link voltage control value compensated in the DC link voltage control unit by the phase signal of the system phase detector;
    a first current control unit compensating for the predetermined AC control value by using the error current between the AC command value from the signal converter and the detected AC;
    a current feed-forward compensator generating the phase signal based on a value generated by dividing the PV power determined by the PV voltage and current by the system voltage;
    a current compensator compensating for the AC control value from the first current control unit in synchronization with the phase signal from the current feed-forward compensator; and
    an inverter pulse-width-modulation (PWM) generator generating the inverter PWM signal based on the AC control value compensated in the current compensator.

10. The apparatus of claim 7, wherein the second converter controller includes:
    a voltage control unit compensating for a predetermined battery current command value by using the error voltage between the battery voltage and the predetermined battery voltage command value;

a current control unit compensating for a predetermined battery current control value by using the error current between the battery current command value compensated in the voltage control unit and the detected battery current; and a second converter pulse-width-modulation (PWM) generator generating a second converter PWM signal by using the battery current control value compensated in the current control unit.

11. A method of charging and discharging a photovoltaic (PV) power conditioning system (PCS) integrated battery applied to a system that includes a first direct-current-to-direct-current (DC/DC) converter connected to a solar cell, a direct-current-to-alternate-current (DC/AC) inverter connected to a system, a DC link unit connected in common to an output terminal of the first DC/DC converter and an output terminal of the DC/AC inverter, and a second DC/DC converter having a bidirectional DC/DC conversion function connected between the DC link unit and the battery, the method comprising:

a detecting step of detecting PV voltage and current detected in a predetermined node, battery voltage and current, system voltage and current, and DC link voltage;

a state determining step of determining any of predetermined first to fourth operating modes based on an amount of photovoltaic power and whether or not the battery is connected, by using the PV voltage and current and the battery voltage and current;

a first control step of controlling the charging of the battery by using the photovoltaic energy of the solar cell in the first operating mode;

a second control step of controlling the first DC/DC converter, the DC/AC inverter, and the second DC/DC converter to charge the battery by using the photovoltaic energy of the solar cell and the voltage of the system in the second operating mode; and a third control step of controlling the first DC/DC converter, the DC/AC inverter, and the second DC/DC converter to charge the battery by using the voltage of the system in a third operating mode.

12. The method of claim 11, further comprising a fourth control step of controlling the first DC/DC converter, the DC/AC inverter, and the second DC/DC converter in order to transfer the photovoltaic energy of the solar cell to the system in the fourth operating mode.

13. The method of claim 12, wherein the state determining step includes determining a first control mode when the power from the solar cell is higher than the charge amount needed in the battery in a state in which the battery is connected, based on the amount of photovoltaic power and whether or not the battery is connected, by using the PV voltage and current and the battery voltage and current, determining a second control mode when the power from the solar cell is not higher than the charge amount needed in the battery in the state in which the battery is connected, determining a third control mode when there is no power from the solar cell in the state in which the battery is connected, and determining a fourth operating mode in the state in which the battery is not connected.

14. The method of claim 13, wherein the first control step includes using the DC/DC converter and the DC/AC inverter to control maximum power point tracking (MPPT), DC link voltage and system link and control the current charging through the second DC/DC converter.

15. The method of claim 14, wherein the second control step includes using the DC/DC converter and the DC/AC inverter to control MPPT, the DC link voltage, and a pulse-width-modulation (PWM) generator and control the current charging through the second DC/DC converter.

16. The method of claim 15, wherein the third control step includes stopping the operation of the DC/DC converter and controlling the current charging and the current discharging by using the DC/AC inverter and the second DC/DC converter.

17. The method of claim 16, wherein the fourth control step includes using the DC/DC converter and the DC/AC inverter to control MPPT, the DC link voltage and the system link and control the operation stop of the second DC/DC converter.

18. The method of claim 17, wherein the controlling the first DC/DC converter of the first to fourth control steps includes:

an MPPT step of performing the predetermined MPPT by using the PV output voltage and the PV current to generate the PV output voltage command value;

a first voltage control step of compensating for the predetermined PV output voltage command value by using the error voltage between the PV output voltage command value from the MPPT step and the PV detecting voltage; and a first converter PWM generating step of generating a first converter PWM signal based on the PV output voltage control value compensated in the first voltage control step.

19. The method of claim 17, wherein the controlling the DC/AC inverter of the first to fourth control steps includes:

a system phase detecting step of detecting the phase of the system voltage and generates the phase signal having the detected phase;

a DC link voltage control step of compensating for a predetermined DC link voltage control value by using error voltage between the DC link voltage and the predetermined DC link voltage command value;

a signal converting step of generating the AC command value by multiplying the DC link voltage control value compensated in the DC link voltage control step by the phase signal of the system phase detector;

a first current control step of compensating for the predetermined AC control value by using the error current between the AC command value from the signal converting step and the detected AC;

a current feed-forward compensating step of generating the phase signal based on a value generated by dividing the PV power determined by the PV voltage and current by the system voltage;

a current compensating step of compensating for the AC control value from the first current control step in synchronization with the phase signal from the current feed-forward compensating step, and an inverter PWM generating step of generating an inverter PWM signal based on the AC control value compensated in the current compensating step.

20. The method of claim 17, wherein the controlling the second DC/DC converter of the first to fourth control steps includes:

a voltage control step of compensating for a predetermined battery current command value by using the error voltage between the battery voltage and the predetermined battery voltage command value;

a current control step of compensating for a predetermined battery current control value by using the error current between the battery current command value compensated in the voltage control step and the detected battery current; and a second converter PWM generating step of generating a second converter PWM signal by using the battery current control value compensated in the current control step.

\* \* \* \* \*